United States Patent [19]

Kuo

[11] 4,428,078
[45] Jan. 24, 1984

[54] WIRELESS AUDIO PASSENGER ENTERTAINMENT SYSTEM (WAPES)

[75] Inventor: Chyi J. Kuo, Bellevue, Wash.

[73] Assignee: The Boeing Company, Seattle, Wash.

[21] Appl. No.: 406,683

[22] Filed: Aug. 9, 1982

Related U.S. Application Data

[63] Continuation of Ser. No. 24,133, Mar. 26, 1979, abandoned, and Ser. No. 239,930, Mar. 3, 1981, abandoned.

[51] Int. Cl.³ .............................................. H04B 5/00
[52] U.S. Cl. ......................................... 455/3; 455/41; 179/82; 340/310 A
[58] Field of Search ....................... 455/3, 4, 6, 39, 41, 455/49, 19, 53, 57, 66, 73, 89, 95, 98, 99, 343, 127, 345, 77, 351; 340/310 R, 310 A, 310 CP; 179/1 VE, 82

[56] References Cited

U.S. PATENT DOCUMENTS

| 2,567,431 | 9/1951 | Halstead | 179/82 |
| 2,851,592 | 9/1958 | Webster, Jr. | 455/77 |
| 2,908,766 | 10/1959 | Taylor | 179/82 |
| 3,162,726 | 12/1964 | Rosenberg | 179/82 |
| 3,553,675 | 1/1971 | Shaver | 455/3 |

FOREIGN PATENT DOCUMENTS

| 851281 | 9/1970 | Canada | 179/82 |
| 666705 | 2/1952 | United Kingdom | 179/82 |

Primary Examiner—Tommy P. Chin
Attorney, Agent, or Firm—Conrad O. Gardner; B. A. Donahue

[57] ABSTRACT

A wireless aircraft passenger entertainment system utilizing simultaneous transmission of low frequency signals for power supply rectification and radio frequency signals for information demodulation between transmission lines parallel with seat tracks in an aircraft passenger compartment and seat leg mounted pick up loops.

2 Claims, 8 Drawing Figures

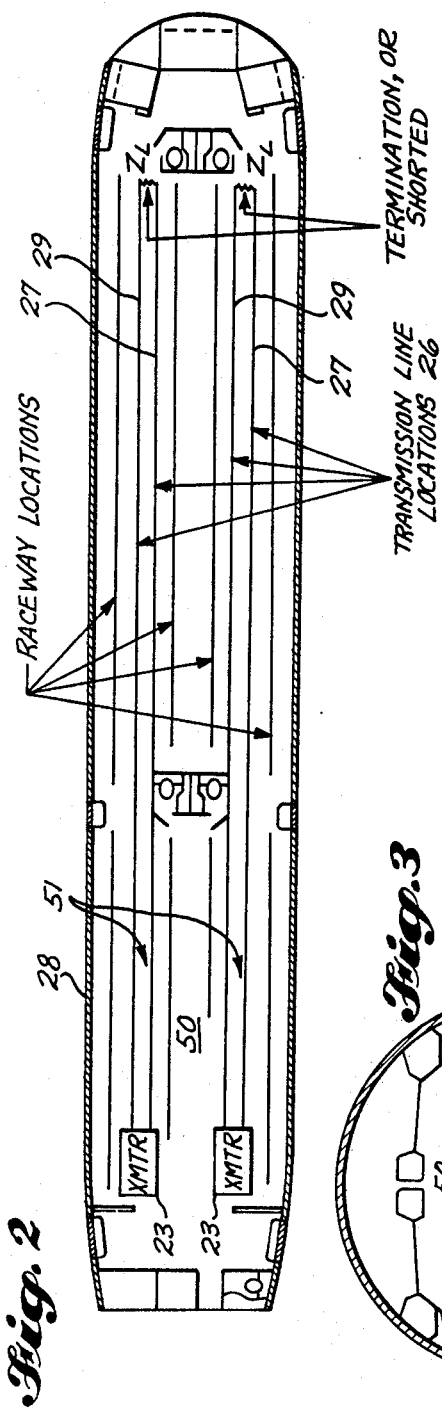
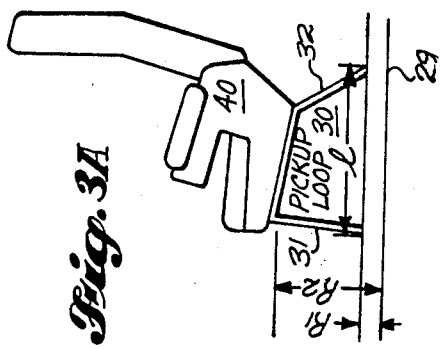
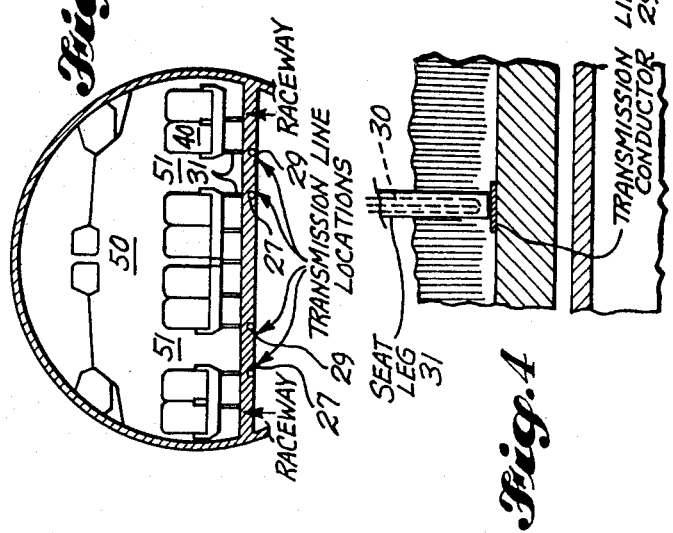

WIRELESS AUDIO PASSENGER ENTERTAINMENT SYSTEM (WAPES)

This is a continuation, of application Ser. No. 24,133, 3-26-79 and Ser. No. 239,930, filed Mar. 3, 1981, both abandoned.

This invention relates to passenger entertainment systems and more particularly to a wireless audio passenger entertainment system (WAPES) wherein a plurality of aircraft seats comprising a seating unit are powered with energy derived from a vertically disposed seat mounted pick up loop.

Heretofore multiple seat communication systems as exemplified by U.S. Pat. Nos. 2,567,431 and 3,401,469 have employed inductive signal coupling however not involving the simultaneous transmission of a low frequency signal for power supply rectification. In this regard, FIG. 2 of U.S. Pat. No. 2,851,592 shows intelligence received and transmitted on a modulated carrier wave of frequency $f_2$ while operating energy is provided by a received and rectified wave of frequency $f_1$, while U.S. Pat. No. 2,415,688 shows inductive coupling of radio operating energy.

Passenger entertainment systems utilized in present aircraft include cables for transmission of signals and power to each seat receiver in an aircraft which cables impose additional weight penalty to an aircraft and further add to maintenance time requirements.

It is accordingly an object of the present invention to provide a passenger entertainment system permitting complete seat mobility without power and entertainment signal cable and wiring hook ups.

It is yet another object of the present invention to provide transmitter and receiver systems for utilization within the fuselage of an aircraft wherein a low frequency signal coupled to a transmission line powers the receiver while a radio frequency signal coupled to the transmission line provides entertainment information to the receiver.

It is a further object of the invention to provide seat means in an aircraft having r.f. and low frequency coupling means for receiving r.f. and low frequency energy simultaneously from a transmission line disposed longitudinally with respect to the center axis of the fuselage of the aircraft.

It is another object of this invention to provide an aircraft cabin passenger entertainment system providing receiver power transmission to a plurality of seat receivers forming a seating unit through an inductive loop disposed in one of the plurality of seats.

Other objects, advantages and features of the present invention will become apparent from the following detailed description taken in conjunction with the drawings in which:

FIG. 2 is a plan view of the cabin floor inside the fuselage of the aircraft showing transmitter transmission line distribution along the longitudinal axis of the fuselage;

FIG. 3 is a partial cross-sectional view of the cabin portion of the aircraft fuselage shown in FIG. 2 further illustrative of individual aisle way disposed twin lead transmission lines;

FIG. 3A is a side view of a seat showing seat leg disposed receiver pick up loop;

FIG. 4 is a detailed partial cross-section of the interior cabin floor portion under the two abreast seats shown on the right hand side of the cabin shown in FIG. 3;

Figure 1:
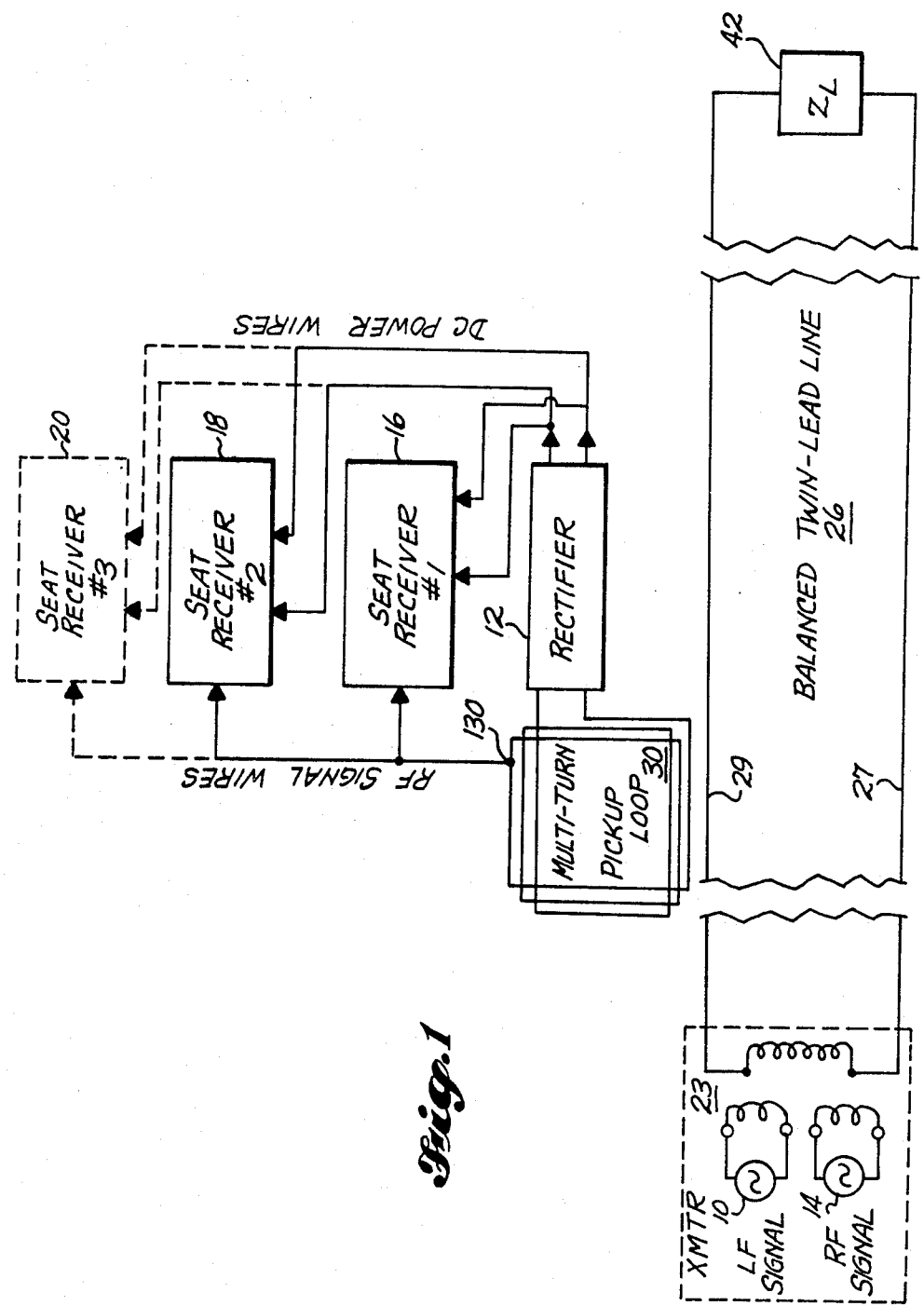
FIG. 1 is a block diagram of an embodiment of the present wireless audio passenger entertainment system.

Turning now to the wireless audio passenger system of FIG. 1 wherein aircraft passenger seat mobility is enhanced, it can be seen that an inductive signal coupling concept is developed to simultaneously transmit a low frequency signal from low frequency signal generator 10 for rectification within inductively coupled power supply 12, and radio frequency (r.f.) signals from r.f. signal generator 14 for demodulation at seat receives 16, 18, and 20. Low frequency and r.f. signals provided respectively by low frequency signal generator 10 and r.f. signal generator 14 are coupled by transmitter coupling network 22 (shown in more detail in FIG. 6) to a balanced twin lead transmission line 26 extending longitudinally along cabin floor portion of the fuselage (as seen in FIG. 2) 28 of the aircraft viz. along the aisles between seat group locations. As seen in FIG. 1, a single power supply 12 provides DC power to all receivers 16, 18, and 20 forming a seat group. Multiturn pick up loop 30 (arranged as described in more detail hereinafter in connection with FIGS. 3 and 4) is utilized in the receiver portion of the present WAPES system to electromagnetically couple the aforementioned low frequency and r.f. signals for utilization by a seat group of receivers 16, 18, and 20. The end of balanced twin lead transmission line 26 opposite signal generators 10 and 14 is terminated by load impedance 42.

Figure 5:
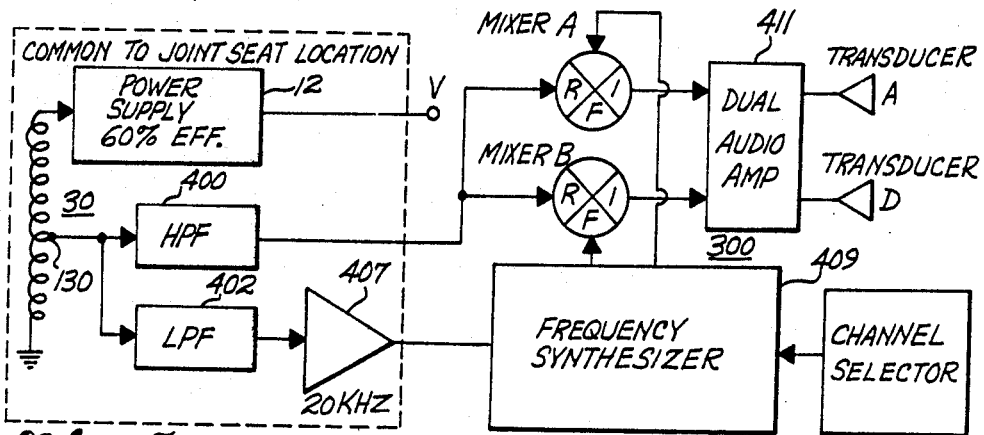
FIG. 5 is a schematic diagram of a receiver system in accordance with an embodiment of the present wireless audio passenger entertainment system.
Figure 6:
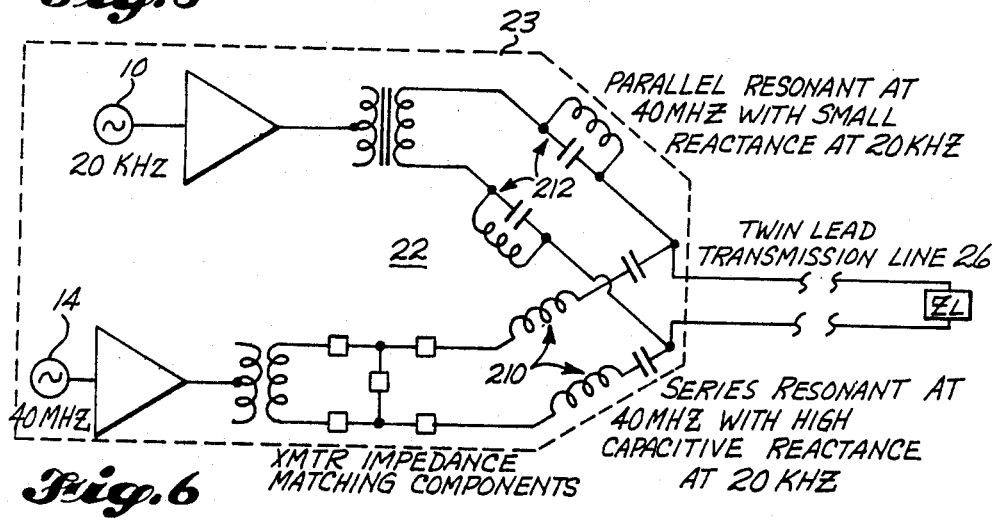
FIG. 6 is a circuit schematic of transmitter including coupling networks utilized in driving the aisle disposed open wire twin lead transmission lines shown in FIG. 2; and, FIG. 7 is a detailed receiver power supply schematic of the receiver power supply shown in FIG. 5.
Figure 7:
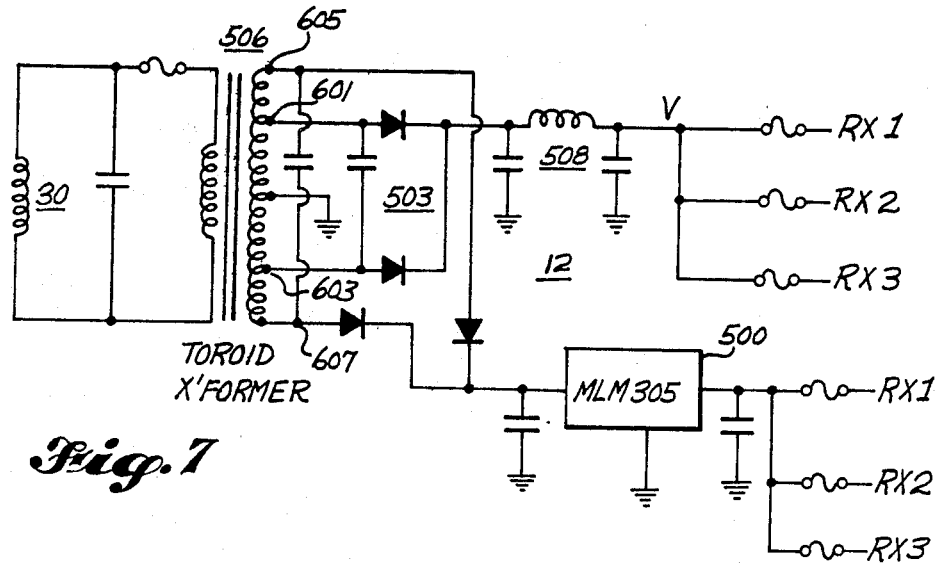

In FIGS. 2 and 3 showing passenger cabin floor transmitter and transmission line configuration, it will be seen that where passenger cabin 50 includes two aisle passageways 51, then a transmitter 23 is arranged at one end of each of aisle passageways 51 and coupled (by a coupling network 22 described hereinafter in connection with FIG. 6 description) to a transmission line 26 disposed in each of the respective passageways 51. These two transmitters must be synchronized to eliminate potential EMI problems between channels, or a single transmitter should be designed to feed both transmission lines 26 simultaneously. Each of lines 26 is seen (at FIG. 3) to comprise a pair of conductors 27 and 29 extending along the lengths of aisle passageways 51 (as seen in FIG. 2), and each of conductors 27 and 29 are seen disposed at respective sides of aisle passageways 51 adjacent the bottom end of seat legs defining the aisle passageways. As seen in FIG. 3A, seat 40 from FIG. 3 (blown up side view thereof) includes pick up loop 30 disposed between front and rear legs 31 and 32 (in a plane vertically disposed with respect to the cabin floor forming the plane containing transmission line 26 conductors 27 and 29). Pick up loop 30 hereinafter described in more detail is mounted directly above and closely adjacent to conductor 29 of twin lead transmission line 26 for increased coupling efficiency while the seat legs on the opposite side of aisle passageway 51 support a further pick up loop (not shown) above and closely adjacent to conductor 27 for servicing the receivers of the middle seat group. The amount of coupled power is a function of several design parameters including amperage flow in the transmission line, the frequency of the signal, size of wire used, and distance between pick up loop and transmission line. The present system's inductive signal coupling for receiver power can serve to also provide power for passenger service functions or provide for recharging of a rechargeable power pack disposed in a seat group. Further, the present low frequency signals may also be utilized to provide precision synchronization between transmitter and receiver by use of the low frequency signal as a system clock source. The power output from inductively coupled power supply 12 of FIGS. 1, 5, and 7 is somewhat proportional to the weight of pick up loop 30 since more power can be obtained by either using more turns, a larger size of wire or employing a permalloy core. Other alternatives consistent with pick up loop operating parameters discussed previously include feeding more current into the transmission line or increasing the signal frequency. Test results and calculations indicate that one to two watts usable power can be obtained from a lightweight pick up loop. Some representative values of what can be achieved in this regard may be seen from representative values listed in the following table:

| CALCULATED VALUES FOR AN INDUCTIVE POWER SUPPLY | | | | | | |
|---|---|---|---|---|---|---|
| PRIMARY POWER SOURCE | | INDUCTIVE LOOP PARAMETERS | | | | |
| FREQ | CURRENT | LOOP SIZE* | WIRE SIZE | NO OF TURNS | WT (OZ) | INDUCED VOLTAGE | MAX OUTPUT POWER |
| 16 KHz | 10 AMP | 20" × 12" | #32 | 100 | 3 | 33 v | 3.1 w |
| 16 KHz | 10 AMP | 20" × 12" | #36 | 100 | 1 | 33 v | 1.2 w |
| 16 KHz | 10 AMP | 20" × 12" | #32 | 50 | 1.5 | 16.5 v | 1.5 w |
| 16 KHz | 5 AMP | 20" × 12" | #32 | 100 | 3 | 16.5 v | 0.78 w |
| 32 KHz | 5 AMP | 20" × 12" | #32 | 50 | 1.5 | 33 v | 6.2 w |
| 20 KHz | 8 AMP | 20" × 12" | #36 | 100 | 1 | 33 v | 1.2 w |

*With 20" Side Parallel to the Transmission Line and Separation by 0.5"

Implementation in the present WAPES system of inductively coupled power supply 12 not only achieves complete seat mobility without the weight and maintenance problems discussed but enables utilization to pick up loop for receipt of WAPES r.f. signals. This r.f. configuration provides two unique features in the present WAPES system, viz. it provides a substantially uniform received signal level at each receiver so that the r.f. dynamic range requirement or the automatic gain control level is very minimal; in addition, the transmitted r.f. signal level requirement is lower and presents less EMI (electromagnetic interference) to other avionics aboard the aircraft than would transmission of the r.f. signal throughout the cabin to individual receiver antennas. This advantage of WAPES is afforded by the present configuration providing close coupling between transmission lines 26 and individual seat group pick up loops 30.

The present WAPES system operating frequency selection is based on EMI requirements, spectral availability, and hardware design considerations.

With regard to EMI requirements, assuming the low frequency carrier signal frequency is around 20 KHZ with a current of 10 amperes flowing into the transmission line, an interference level 30 db above a permitted level might exist. Therefore, all sensitive systems aboard the aircraft which might respond in this frequency range must be given an added 30 db of separation distance from the WAPES transmission lines 26. This 30 db additional separation distance is about 7 to 20 inches. With respect to electromagnetic field dissipation outside the aircraft fuselage it should be noted that passenger windows on the aircraft fuselage can be considered the primary source of leakage, the passenger cabin windows presenting a periodically apertured conducting plane through which electromagnetic waves can pass. Based on a calculation of the voltage transmission coefficient, the ratio of the output voltage to the input voltage for a present aircraft window structure e.g. Boeing Airplane Company type 747 aircraft, a computer analysis indicates that frequencies below about 60 MHz provide practically no leakage through windows. 60 MHz was the cutoff frequency because at this frequency the circumference of a window becomes a significant part of a wavelength viz. about one fourth wavelength.

With regard to spectrum availability it should be observed that to minimize interference possibilities, the WAPES r.f. frequency should be allocated within a spectrum not utilized by avionics equipment. The following table shows spectrum usage in MF, HF, and VHF bands for avionics:

| Frequency | Avionics System |
|---|---|
| 10–14 KHz | Omega |
| 90–110 KHz | Loran "C" |
| 90–505 KHz | ADF |
| 1650–1750 KHz | |
| 1750–1950 KHz | Loran "A" |
| 2–30 MHz | HF Com. |
| 75 MHz | Marker Beacon |

Since 60 MHz as discussed is the WAPES maximum cutoff frequency, the available spectral windows then become:
window I: 505 KHz to 1650 KHz
window II: 30 MHz to 60 MHz However utilization of window I, viz. the band of 505 KHz to 1650 KHz utilized for AM broadcasting could interfere pilot's news acquisition by the ADF receiver; therefore, ADF receiver interference must be considered with respect to use of window I.

With respect to WAPES system hardware design considerations it should be noted that generally speaking, a lower frequency band is preferable on a receiver design based on lower power consumption and less parasitic components associated with circuit elements all ultimately resulting in cost savings. However, a higher frequency band is desirable for transmitter design so that the total bandwidth to carrier frequency ratio ($Bw/f_c$) is small to simplify the final power amplifier (PA) design with respect to amplifier distortion, intermodulation and linearity. Then, without impact of other factors, the lower band should be selected based on the rationale that the WAPES receiver, due to the total number of units involved, is more important than the system transmitter in terms of system costs. Since coupling power is proportional to the carrier frequency, utilization of a higher carrier frequency for the inductive power supply system is preferred.

The utilization of twin lead transmission line 26 coupled to the output of transmitter 23 at the 40 MHz frequency range results in considerable radiation from the transmission line based on the relatively large spacing between conductors 27 and 29 since the equivalent circuit of transmission line 26 at 40 MHz is a large loop antenna. However, pick up loop 30 for the receivers when closely coupled to one of leads 27 and 29 dominates the response of the receivers from the near field on one conductor of twin lead transmission line 26. Transmission lines 26 since completely surrounded by the fuselage will be prevented from providing significant radiation outside of the aircraft fuselage with principal radiation emanating from the slots and windows at 40 MHz these being considered poor radiators. The r.f. skin depth of aluminum at 40 MHz is approximately 1 mil; thus, normal aircraft skin should provide high shielding effectiveness. Because transmission line 26 as an antenna cannot radiate outside of the fuselage, its driving point impedance will be largely reactive thus requiring a transmitter output matching network to provide a flat load. To compute the signal induced in the receiver antenna from a 40 MHz transmission low loop current, an estimate is required for the radiation over the length of passenger cabin portion of the fuselage section used. A quantitative estimate of current reduction along the line by a factor of two is considered resonable for worst case conditions. Multiturn pick up loop 30 (as seen in FIG. 1) shown is tapped at 130 to provide a single turn antenna for r.f. signal coupling from conductor 29 of balanced twin lead 26 to seat receivers 16, 18, and 20. Such single turn receiving antenna with resonance at center a frequency of about 41 MHz with a maximum VSWR of 5:1 estimated over a 2 MHz bandwidth should result in a mismatch loss of 2.5 db to a matched receiver. Assuming a 1 watt r.f. output from transmitter 23 spread uniformly over 24 channels desired in an aircraft passenger entertainment environment, the power in each signal channel is approximately 40 milliwatt which is applied at the input of twin lead transmission line 26. Assuming a terminated transmission line 26 resistance of 100 ohms with the reactive components tuned out, the 40 MHz current in the terminated transmission line becomes:

$$I = \sqrt{\frac{0.04}{100}} = 20 \text{ milliamperes}$$

The current on a portion of the line may be as low as 10 milliamperes due to radiation losses. Computing the voltage induced in the receiver antenna assuming the magnetic field falls off at 1/R from the transmission line, the open circuit voltage in the receiving antenna becomes:

$$V = \frac{w\mu l I}{2\pi} \cdot L_n\left(\frac{R_2}{R_1}\right)$$

where w = signal frequency
$L_n$ = natural logarithm
$\mu$ = permeability
l = length of receiving antenna loop (see FIG. 3A)
I = current
$R_1$ = distance between receiving antenna single turn loop and transmission line conductor 29.
$R_2 = R_1$ = width of receiving antenna single turn loop.

In the present WAPES system embodiment:
l = 20 inches
$R_2$ = 10.5 inches
$R_1$ = 0.5 inch The rms open circuit voltage is calculated to be (1.5) volts. Mismatch due to receiving antenna VSWR will reduce this figure, but a worst case input to the receiver should be 3 millivolts which is deemed a satisfactory signal strength for a V.H.F. receiver. Blocking capacitors resonated by their lead inductive reactance at 40 MHz will provide the requisite isolation between the 20 KHz power supply and the receiver input. Based on a 15 db above 1 microvolt per meter noise level in the 40 to 42 MHz band, this signal will provide a 53 db signal-to-noise ratio (S/N). A transmitter power at 10 to 50 watts for an AM system is required if a S/N of 60 db is desired.

The single turn portion by a simple tap 130 (as seen in FIG. 1) of multiturn loop 30 provides the receiving antenna for r.f. signals since the inductive reactance of multiturn loop 30 at 40 MHz is too high for 40 MHz application. While the receiving antenna is shown as a single turn tap from multiturn inductive power supply pick up loop 30, a separate small single turn located within inductive power supply pick up loop 30 could be utilized instead to eliminate a high pass filter design requirement which is necessary to block off the L.F. signals into r.f. receiver. An alternate small receiver loop antenna with a rectangular shaped loop about 6 inches by 3 inches will have an induced r.f. open circuit rms voltage about 290 millivolts. With the circuit resonated at 41 MHz, a minimum signal level of 3 millivolts can then be expected to feed to a receiver. A wavelength at 40 MHz is approximately 300 inches and therefore an efficient antenna such as a quarter wave monopole is impractical in the WAPES environment. An increased number of turns in the receiver antenna will however produce a more efficient antenna.

Turning now to FIG. 5 and transmitter 23 design it can be noted that since few WAPES transmitters are required compared to the number of WAPES receivers required, their weight, cost, and packaging does not become a significant drawback in WAPES system implementation aboard passenger cabins of commercial aircraft. For the present WAPES the 40 MHz transmitter signal source 14 and 20 KHz power supply signal source 10 will be located at the same body station aboard the aircraft and both are required to drive terminated twin lead transmission line 26, a potential isolation problem must be addressed, however the frequency separation between power and r.f. frequencies lends itself advantageously to selective filtering with lumped circuit components. FIG. 6 is illustrative of an equivalent circuit for providing the requisite isolation. 40 MHz r.f. power 14 is coupled to terminated twin lead transmission line 26 by a pair of series resonant L/C network 210 which with appropriate component values is expected to provide (1) a sufficiently low Q so that reactance variation over the 2 MHz band from 40 to 42 MHz will be small enough to present a constant load impedance to the transmitter, and (2) a high impedance at 20 KHz power frequency to isolate and prevent the panel frequency signal from entering the r.f. transmitter. To prevent the 40 MHz signal from entering the 20 KHz audio amplifier, parallel resonant (40 MHz) L/C networks 212 are placed in series with each lead of the 20 KHz power supply lines, the inductors being required to carry the full load current of 20 KHz power and therefore may comprise air core coils of copper wire capable of carrying 10 amperes constant current at 20 KHz. These two transmitters should be properly synchronized to eliminate potential co-channel interference, or a single transmitter should be designed to feed both transmission lines.

Turning now to FIG. 5, a receiver 300 (providing product AM demodulation) is shown coupled to tap 130 of multiturn loop 30. This type receiver is shown for use in a WAPES system utilizing r.f. transmitter 14 transmission of double sideband (DSB) or single sideband (SSB) suppressed carrier modulation. Such transmitter mode permits direct demodulation of the r.f. spectrum for receiver 300 design since a precision system frequency reference (power frequency signal) is readily available. Power supply 12 provides the desired voltage for receiver 300 operation, and this V developed at a common joint seat location is seen in FIG. 7 to provide power to the several receivers $R_1$, $R_2$, and $R_3$ common to the joint seat location. An exemplary power supply 12 schematic is shown in more detail in FIG. 7, and it should be noted further that a high pass filter 400 is coupled in series between the receiver antenna (provided at tap 130 of multiturn loop 30) and the mixer inputs of receiver 300 (to extract the r.f. spectrum from the 20 KHz voltage) while a low pass filter 402 is connected from tap 130 to the frequency synthesizer since receiver 300 (providing product AM demodulation) requires the 20 KHz reference signal.

Exemplary channel selection provisions of receiver 300 are as follows:

| CHANNEL NO. | A CHAN. FREQ. | B CHAN. FREQ. |
|---|---|---|
| 1 | 42.0 MHz | 40.5 MHz |
| 2 | 41.92 | 40.46 |
| 3 | 41.84 | 40.42 |
| 4 | 41.76 | 40.38 |
| 5 | 41.68 | 40.34 |
| 6 | 41.60 | 40.30 |
| 7 | 41.52 | 40.26 |
| 8 | 41.44 | 40.22 |
| 9 | 41.36 | 40.18 |
| 10 | 41.28 | 40.14 |
| 11 | 41.20 | 40.10 |
| 12 | 41.12 | 40.06 |

Receiver 300 power consumption is as follows:

| COMPONENT | POWER CONSUMPTION |
|---|---|
| 20 KHz amplifier limiter 407 | 1 milliwatt |
| frequency synthesizer 409 | 100 milliwatts |
| audio amplifier 411 | 240 milliwatts |

Total power consumption receiver 300 = 300 milliwatts
Power supply 12 at 60% efficiency, total power = 420 milliwatts
for 2 seats, total power = 840 milliwatts
for 3 seats, total power = 1260 milliwatts Turning now to FIG. 7 showing a detailed schematic of joint seat location power supply 12 of the receiving system of FIG. 5, calculations of powers and efficiencies thereof are shown in the following:

(1) Assuming that three seat receivers $R_1$, $R_2$, and $R_3$ shown at 16, 18, and 20 in FIG. 1 are under full load operating from the single power supply shown, each receiver requiring 4 milliamperes at 10 volts of well regulated voltage and 26 milliamperes at a total of 10 volts of unregulated voltage.

Total Regulated: 12 milliamperes at 10 v
Total Unregulated: 78 milliamperes at 10 v (2) Regulation power loss. Assuming MLM voltage regulator 500 is utilized which draws 0.8 milliamperes at no load, and has an input voltage of 18 volts, then:

Total current flow through voltage regulator 500 is 12.8 milliamperes at 18 v.

(3) Rectifier loss. Assuming single phase full wave center tapped rectification 503 is utilized with conventional diodes (0.7 v voltage drop), voltages required are 18.7 VDC and 10.7 VDC.

(4) Secondary power required (neglecting 1R loss in transformer 506 and filter circuit 508):
18.7 v at 12.8 milliamperes +10.7 volts at 78 milliamperes = 1.07 watts
at 18.7 VDC $V_{RMS} \approx 13.2$ VAC RMS at 18.1 ma RMS
at 10.7 VDC $V_{RMS} \approx 7.6$ VAC RMS at 110 ma RMS (5) With an efficient step down transformer 506, pick up loop 30 requires 1.19 watts of induced power (assuming 10% transformer secondary winding power loss).

(6) Based on 1.19 watts of power, a load impedance of 4 ohms and an interval impedance of 42 ohms, the turns ratio of transformer 506 should be 1.64:1 for the inner winding provided between taps 601 and 603 and 2.82:1 for the outer winding provided between taps 605 and 607.

(7) Power supply efficiency = $\frac{\text{Total power to Loads}}{\text{Input Power}}$ (assuming 10% transformer primary winding power loss) = $\frac{0.9 \text{ Watts}}{1.32 \text{ Watts}}$ = 68%

The installation of the present WAPES system should preclude closed electrical loops such as seat tracks, etc. nearby which could couple away power from transmission line 26. To provide decoupling of undesired loops nearby, a piece of dielectric material can be inserted in such loops such as seat tracks, etc. at about every ten feet to break up DC continuity. Utilization of the present WAPES system environment is exemplary of deployment of the present system which also be deployed in lecture rooms, conference rooms or other meeting or entertainment areas having need for user selection of multi-channel information transmissions.

While an audio (WAPES) embodiment of the present entertainment system is shown, video information and receiver power transmission embodiment (VIPES) of the present entertainment system will now become apparent to those skilled in the art practicing the hereinbefore described teachings of the present invention.

What is claimed is:

1. A passenger entertainment system for transmission by simultaneous inductive coupling of receiver power and intelligence information signals to a plurality of seat units disposed on a floor support, said system comprising:

transmitter means for generating said receiver power and intelligence information signals;

receiver means and power supply means for powering said receiver associated with each of said plurality of seat units;

a transmission line comprising a pair of spaced apart conductors coupled to said transmitter means, said pair of spaced apart conductors disposed substantially in the plane of said floor support;

a multiturn pick up loop disposed adjacent to said floor support, said multiturn pick up loop coupled to said receiver means and said power supply means; and, wherein said receiver power signal has a frequency of around 20 KH$_z$, and said intelligence information signal has a frequency of around 40 MH$_z$.

2. A wireless audio passenger entertainment system (WAPES) for transmission by simultaneous inductive coupling of receiver power and intelligence information signals to a plurality of seat units disposed on a floor support, said system comprising:

transmitter means for generating said receiver power and intelligence information signals;

receiver means and power supply means for powering said receiver associated with each of said plurality of seat units;

a transmission line comprising a pair of spaced apart conductors coupled to said transmitter means, said pair of spaced apart conductors disposed substantially in the plane of said floor support;

a multiturn pick up loop disposed adjacent to said floor support, said multiturn pick up loop coupled to said receiver means and said power supply means; and wherein said receiver power signal has a frequency of around 20 KH$_z$, and said intelligence information signal has a frequency of around 40 MH$_z$.

* * * * *